Patented July 16, 1946

2,404,204

UNITED STATES PATENT OFFICE 2,404,204

DECARBOXYLATED HALF ESTERS OF HYDROXYLATED FATTY OILS AND ALPHA UNSATURATED POLYCARBOXYLIC ACIDS

Maynard C. Agens and Birger W. Nordlander, Schenectady, N. Y., assignors to General Electric Company, a corporation of New York No Drawing. Application January 20, 1943, Serial No. 472,988

19 Claims. (Cl. 260—23)

The present invention relates to polymerizable resinous compositions comprising decarboxylated partial or half esters of hydroxylated fatty oils, such as castor oil or hydrogenated castor oil, and an alpha unsaturated polycarboxylic acid. It is concerned particularly with compositions of this type capable of being polymerized by application of heat to a solid state.

In the copending patent application, Serial No. 422,905 (now Patent 2,373,527), filed December 13, 1941, in the name of Maynard C. Agens and assigned to the same assignee as the present invention are disclosed and claimed synthetic resinous compositions comprising decarboxylated partially esterified alpha-unsaturated polycarboxylic acids in which the ester group or groups were derived from mono- or polyhydric alcohols. The partial esters were generally prepared by reacting an alpha unsaturated polycarboxylic acid, such as maleic acid or its anhydride, with an alcohol in proportions such that about one-half of the carboxyl groups of the acid remained unesterified in the reaction product. The partial ester was heated with decarboxylating agents such as pyridine, quinoline, nicotine, piperidine, and their homologues capable of decarboxylating the free carboxyl groups of the acid. The resulting products were heat-polymerizable.

The present invention is concerned with polymerizable compounds of the above general type in which the alcoholic radical is one derived from castor oil or an equivalent polyester of a long chain hydroxy fatty acid and a polyhydric alcohol. The free hydroxyl groups of the fatty acid radicals are reacted with an alpha unsaturated polycarboxylic acid, specifically an alpha unsaturated alpha, beta dicarboxylic acid such as maleic acid or its anhydride, in proportions such that the principal products are acid or half esters of the polycarboxylic acid. Decarboxylation of these half esters by heating with a decarboxylating agent has been found to result in the formation of oily or syrupy resinous compositions which polymerize on heating to a solid, infusible, and somewhat elastic or flexible state and which are particularly useful for making castings, as filling compounds, etc.

Particularly useful compositions are obtained by copolymerizing the decarboxylated products with other compatible polymerizable compounds, e. g. styrene and the higher methacrylic esters such as butyl methacrylate, capable of polymerizing by virtue of the polymerizable $$CH_2=C\diagdown$$ group.

Butyl methacrylate has been found to be an ideal material for this purpose when elastic or flexible products are desired. Styrene gives a more rigid copolymer which is elastic or flexible at elevated temperatures. Another composition useful for the production of heat-hardened cast bodies or filling compounds is a mixture of at least twenty per cent by weight of the decarboxylation product with raw castor oil. Such mixtures may be modified by the addition of butyl methacrylate or the like.

The following examples will serve to illustrate typical compositions falling within the scope of the present invention:

Example 1

| | |
|---|---|
| Castor oil | 742.5 g. (0.8 mol) |
| Maleic anhydride | 157.5 g. (1.6 mols) |

The above ingredients were heated together for 46 minutes, the temperature rising to 179° C. The acid value dropped from an original 200 to 101 showing that the anhydride reaction resulting in the formation of a maleic ester had taken place. About 10 g. (0.12 mol) pyridine was added to 500 g. of the above reaction product and the heating continued at temperatures ranging from 110° to 200° over a 2¾ hour period. During this time another 10 g. of pyridine was added. Considerable carbon dioxide was evolved during the reaction period. The final product was a viscous resin having an acid value of 36.4. With a peroxide catalyst such as benzoyl peroxide this resin set to a solid, flexible state when heated on a steam bath.

A 25 per cent solution of the resinous product in monomeric butyl methacrylate was used to gel a large quantity of raw castor oil in the following manner:

| | Parts by weight |
|---|---|
| 25% solution of resin in butyl methacrylate | 25 |
| Castor oil containing 1½% benzoyl peroxide | 75 |

The above ingredients were thoroughly mixed and the mixture heated in an 80° C. oven. An infusible, flexible gel was formed in one-half hour. The heat-gellable mixture was particularly adapted for use as a heat-hardenable filling compound for electrical apparatus.

Example 2

| | |
|---|---|
| Castor oil | 462 g. (.5 mol) |
| Maleic anhydride | 73.5 g. (.75 mol) |

The above were heated together for one-half hour at 100° C. to 178° C. The product, consisting essentially of the half ester, was cooled to 121° C. and about 15 g. (0.18 mol) pyridine added and the resultant mixture heated for 2 hours at 121° to 228° C. to form a reddish, viscous resin having an acid value of 39. The resin solidified in bulk when heated with a polymerization catalyst such as benzoyl peroxide.

A gellable composition prepared from this resin had the following composition:

| | Parts by weight |
|---|---|
| Resin | 25 |
| Butyl methacrylate | 25 |
| Castor oil | 50 |
| Benzoyl peroxide | 0.5 |

This composition gelled to an elastic, solid when heated for 30 minutes at 80° C.

*Example 3*

A heat-gellable composition consisting of castor oil and the decarboxylated maleic anhydride-castor oil reaction product of Example 2 was made as follows:

| | Parts by weight |
|---|---|
| Castor oil containing 1½% benzoyl peroxide | 70 |
| Resin of Example 2 | 30 |

This mixture could be gelled by heating to 80° C. for 2 hours. The exact gel time depends on the acid value of the decarboxylation product. If the acid value does not substantially exceed 30, two hours heating at 80° C. is ample. With higher acid value products, a somewhat longer curing time may be found necessary.

The heat-gellable product of Example 3 is particularly useful as a filling compound for electrical apparatus where a flexible or elastic, shock-absorbing filler possessing good electrical properties is required. Neither natural rubber nor synthetic rubbers such as Hycar are swelled by any of these castor oil products. In some cases the natural and synthetic rubbers exert a slight inhibiting effect on the gellation of the portion of the filling compound in direct contact with the rubber but this effect may be overcome by coating the surface of the rubber prior to introduction of the filling compound with a suitable lacquer.

*Example 4*

This example illustrates the preparation of a flexible infusible copolymer of the decarboxylated castor oil-maleic anhydride esterification product and butyl methacrylate.

A solution of 75 g. of the liquid resin of Example 2 in 75 g. butyl methacrylate was mixed with 160 g. additional butyl methacrylate and 0.375 g. benzoyl peroxide. The copolymer formed by heating the mixture for 15 hours at 50° C., 8 hours at 80° C., and 8 hours at 100° C. was an infusible, flexible solid which at elevated temperatures was very rubbery and elastic. It had a dielectric constant of 6.4 at a frequency of 60 cycles and 3.6 at 1000 cycles. It was found to be useful for the same applications as the castor oil gels of the previous examples.

*Example 5*

A styrene copolymer was prepared by heating a mixture of 10 parts styrene and 1 part of the decarboxylation product of Example 2 with 1 per cent by weight of a peroxide catalyst, specifically tertiary butyl hydroperoxide. After 15 hours heating at 60° C. a flexible gel was obtained. Further heating for 8 hours at 80° C. and 15 hours at 100° C. resulted in the formation of a rigid product which became flexible but did not deform at 150° C. Unlike polystyrene, the copolymer does not flow at elevated temperatures. At 150° C. the product had a power factor of 0.003 at 60 cycles. The same copolymer containing 75 per cent flint as a filler had a dielectric constant of 3.8 and a power factor of 0.003 at 40 megacycles at room temperature.

Although maleic anhydride and pyridine have been used in illustrating the manner in which the present invention may be carried into effect, it is to be understood that other alpha unsaturated polycarboxylic acids and other decarboxylating agents may be substituted for these specific materials as is set forth more fully in the above-mentioned patent application, Serial No. 422,905. Examples of other suitable unsaturated polycarboxylic acids are fumaric acid, itaconic acid, and aconitic acid. The alpha unsaturated, alpha, beta dicarboxylic acids such as maleic and fumaric acids are preferred since the free carboxyl groups in the mono-esterification products of either of these acids are readily decarboxylated to form terminal $CH_2=CH<$ groups irrespective of which carboxyl group of the acid reactant has become esterified by reaction with the hydroxyl groups on the fatty acid radicals.

Decarboxylating agents found suitable for the practice of the present invention are those selected from the group consisting of pyridine, quinoline, nicotine, piperidine, and their homologues.

The hydroxylated fatty oil half-esters of the alpha unsaturated acids or their anhydrides may theoretically be formed by reacting the oil and acid in equimolecular proportions. However, faster reaction rates and better products are obtained when the mol ratio of polycarboxylic acid to fatty oil is somewhat greater than 1:1, for example about 1.5:1. When 3 mols maleic anhydride were reacted with 1 mol castor oil and the resulting product decarboxylated by treatment with pyridine, a very viscous, reddish resin having an acid value of 77 was obtained. The product polymerized quite rapidly on heating with a peroxide catalyst. In general, we prefer to react at least one and not exceeding approximately two mols of alpha unsaturated polycarboxylic acid with each mol of castor oil as the products so obtained are most easily handled in the preparation of copolymers or gels.

The amount of decarboxylating agent used need not exceed the minimum quantity found necessary to decarboxylate the free carboxyl groups. In general, from 0.1 to 0.3 mol of decarboxylating agent per mol polycarboxylic acid is sufficient.

The oily resinous decarboxylation products of this invention may be employed in applications other than those which are specifically mentioned hereinbefore. Since they exhibit good curing and air-drying properties, particularly in the presence of siccatives, they may be used in the preparation of coating compositions, impregnating compositions, insulating compositions, etc. with or without the addition of fillers, such as wood flour, asbestos, glass fiber, sand, paper, etc.

What we claim as new and desire to secure by Letters Patent of the United States, is:

1. A polymerizable decarboxylated partial esterification product of a hydroxylated fatty oil and an alpha unsaturated polycarboxylic acid obtained by heating a partial esterification product of a hydroxylated fatty oil and an alpha unsaturated polycarboxylic acid containing free carboxyl groups with an amine selected from the group consisting of pyridine, quinoline, nicotine, piperidine, and their homologues.

2. A heat-polymerizable composition of matter comprising a resinous compound obtained by heating a hydroxylated fatty oil half-acid ester of an alpha unsaturated polycarboxylic acid with a cyclic amine selected from the group consisting of pyridine, quinoline, nicotine, piperidine, and their homologues to effect decarboxylation of unesterified carboxyl groups of said ester.

3. A heat-curable composition of matter comprising (1) a decarboxylated, hydroxylated fatty oil acid ester of an alpha unsaturated polycarboxylic acid obtained by heating a partial esterification product of a hydroxylated fatty oil and an alpha unsaturated polycarboxylic acid containing free carboxyl groups with an amine selected from the group consisting of pyridine, quinoline, nicotine, piperidine, and their homologues and (2) a methacrylic ester of an aliphatic alcohol compatible with (1).

4. The heat-cured composition of claim 3.

5. A composition as in claim 3 wherein the alpha unsaturated polycarboxylic acid is an alpha unsaturated alpha, beta polycarboxylic acid.

6. A heat-curable composition of matter comprising (1) a polymerizable compound obtained by heating (a) a partial esterification product of poly ester of a long chain hydroxy fatty acid and an alpha unsaturated dicarboxylic acid, about one-half of the carboxyl groups of the dicarboxylic acid component of said ester being unesterified, with (b) a cyclic amine selected from the group consisting of pyridine, nicotine, quinoline, piperidine, and their homologues to effect decarboxylation of unesterified carboxyl groups of said alpha unsaturated dicarboxylic acid and (2) castor oil.

7. A composition of matter capable of forming a stable gel on heating comprising a major portion of castor oil and a minor portion of a polymerizable resinous material obtained by heating a partial esterification product of castor oil and an alpha unsaturated dicarboxylic acid with a cyclic amine selected from the group consisting of pyridine, nicotine, quinoline, piperidine, and their homologues to effect decarboxylation of unesterified carboxyl groups of said alpha unsaturated dicarboxylic acid.

8. A composition of matter capable of being converted to a non-fusible stable gel on heating comprising castor oil and at least 20 per cent by weight of a polymerizable resinous material obtained by decarboxylating a partial esterification product of castor oil and maleic anhydride by heating said partial esterification product with a decarboxylating agent selected from the group consisting of pyridine, nicotine, quinoline, piperidine and their homoloogues.

9. A heat-gellable composition of matter comprising castor oil and at least 20 per cent by weight of a decarboxylated partial ester obtained by heating together (1) the partial esterification product of one mol castor oil with from 1 to 2 mols maleic anhydride and (2) from 0.1 to 0.3 mol pyridine per mol maleic anhydride used in preparing the partial esterification product of (1).

10. The heat-gelled product of claim 8.

11. A composition of matter comprising castor oil and at least 20 per cent by weight of a polymerizable composition comprising a decarboxylated acid ester of an alpha unsaturated, alpha, beta dicarboxylic acid and castor oil obtained by heating said acid ester in the presence of a decarboxylating agent selected from the group consisting of pyridine, nicotine, quinoline, piperidine, and their homologues.

12. A composition of matter comprising (1) a resinous material obtained by heating a partial ester of castor oil and an alpha unsaturated alpha, beta polycarboxlic acid in the presence of a cyclic amine selected from the group consisting of pyridine, quinoline, nicotine, piperidine, and their homologues to effect decarboxylation of the unesterified carboxyl groups of said ester and (2) a methacrylic ester of an aliphatic alcohol compatible with (1).

13. A composition as in claim 12 wherein the methacrylic ester is butyl methacrylate.

14. A heat-curable composition of matter comprising (1) a polymerizable liquid obtained by heating a partial esterification product of one mol of castor oil and from 1 to 2 mols maleic anhydride with pyridine to effect decarboxylation of unesterified carboxyl groups in said partial esterification product and (2) styrene.

15. A heat-gellable composition of matter comprising castor oil and a butyl methacrylate solution of a polymerizable liquid obtained by heating a partial esterification product of one mol of castor oil and 1 to 2 mols maleic anhydride with from 0.1 to 0.3 mol of pyridine per mol maleic anhydride to effect decarboxylation of unesterified carboxyl groups in said partial esterification product.

16. A process which comprises forming a partial ester of an alpha unsaturated polycarboxlic acid and a hydroxylated fatty oil and decarboxylating the free acid group by heating said partial ester in the presence of a decarboxylating agent selected from the group consisting of pyridine, quinoline, nicotine, piperidine, and their homologues.

17. A process which comprises heat-reacting a hydroxylated fatty acid oil with an alpha unsaturated alpha, beta dicarboxylic acid to form an acid ester in which approximately half of the acid groups of said dicarboxylic acid are unesterified and heating said acid ester in contact with an agent selected from the group consisting of pyridine, quinoline, nicotine, piperidine, and their homologues to decarboxylate the unesterified carboxyl group.

18. The process which comprises forming a castor oil acid-ester of maleic acid and decarboxylating the unesterified carboxyl groups on said acid-ester by heating said ester in the presence of a decarboxylating agent selected from the group consisting of pyridine, quinoline, nicotine, piperidine, and their homologues.

19. The process which comprises heating a hydroxylated fatty acid oil with maleic anhydride to form a half ester of maleic acid and heating said half ester with pyridine to decarboxylate the free carboxyl groups of said half ester.

MAYNARD C. AGENS.
BIRGER W. NORDLANDER.